United States Patent [19]

Heeger et al.

[11] Patent Number: 5,171,632
[45] Date of Patent: Dec. 15, 1992

[54] CONDUCTIVE POLYMER BLENDS AND METHODS FOR MAKING THE SAME

[75] Inventors: Alan J. Heeger; Paul Smith, both of Santa Barbara, Calif.; Shizuo Tokito, Onojo, Japan; Jeffrey D. Moulton, Santa Barbara, Calif.

[73] Assignee: Regents of the University of California, Oakland, Calif.

[21] Appl. No.: 468,737

[22] Filed: Jan. 24, 1990

[51] Int. Cl.⁵ .................. B32B 27/36; C08L 67/02; C08G 63/91
[52] U.S. Cl. .................. 428/364; 428/500; 428/902; 524/571; 524/585; 525/64; 525/171; 525/942; 526/348.1; 528/502
[58] Field of Search .............. 428/500, 515, 910, 364, 428/394, 395, 902; 528/502; 524/571, 585; 526/348.1; 525/64, 171, 942

[56] References Cited

U.S. PATENT DOCUMENTS

| | | | |
|---|---|---|---|
| 3,401,152 | 10/1968 | Wessling et al. | 528/373 |
| 3,706,677 | 12/1972 | Wessling et al. | 528/373 |
| 4,344,908 | 8/1982 | Smith et al. | 528/502 |
| 4,802,745 | 2/1989 | Okada et al. | 528/502 |
| 4,804,594 | 2/1989 | Jow et al. | 429/213 |
| 4,868,284 | 9/1989 | Murase et al. | 528/502 |
| 4,900,782 | 2/1990 | Han et al. | 524/174 |

OTHER PUBLICATIONS

Hotta et al., *Synth. Metals* 26:267–279 (1988).
Jen et al., *J. Chem. Soc., Chem. Commun.* 4:309-11 (1987).
Gagnon et al., *Amer. Chem. Soc. Polymer Preprints and Papers* 25:284-285 (1984).
Hotta et al., *Macromolecules* 20:212-215 (1987).
Momii et al., *Chemistry Letters* 7:1201-4 (1988).
Nowak et al., *Macromolecules* 22:2917-2926 (1989).
Yamada et al., *J. Chem. Soc., Chem. Commun.* 19:1448-9 (1987).

*Primary Examiner*—Jenna L. Davis
*Assistant Examiner*—Kathryne E. Shelborne
*Attorney, Agent, or Firm*—Morrison & Foerster

[57] ABSTRACT

Shaped articles such as fibers, films, tapes, rods and the like are fabricated from composites of nonconducting, flexible chain carrier polymers and conductive, conjugated polymers. The shaped, composite articles are electrically conductive and also display excellent mechanical properties, i.e., with respect to tensile strength, elongation at break, and the like. Methods of preparing the novel composite articles are disclosed as well.

17 Claims, 3 Drawing Sheets

$R = n\text{-}C_8H_{17}$, octylthiophene
$n\text{-}C_{12}H_{25}$, dodecylthiophene

R= n-C$_8$H$_{17}$, octylthiophene
n-C$_{12}$H$_{25}$, dodecylthiophene

Figure 1

Synthesis of Poly (2,5-dimethoxy-p-phenylenevinylene)

NaOH | H₂O
at 0 ~5 °C

Sulfonium Salt Precursor
Polymer in aqueous
solution (PTS)Na

CONDUCTIVE POLYMER BLENDS AND METHODS FOR MAKING THE SAME

FIELD OF THE INVENTION

This invention relates generally to conducting polymers, and more particularly relates to polymer blends and/or composites fabricated by means of carrier polymers so as to provide shaped articles such as fibers, tapes, rods and films which are conductive and which also exhibit excellent mechanical properties.

BACKGROUND OF THE INVENTION

With the discovery of conducting polymers in the late 1970s, the possibility of combining the important electronic and optical properties of semiconductors and metals with the attractive mechanical properties and processing advantages of polymers was proposed Without exception, however, the initial conducting polymer systems were insoluble, intractable, and nonmelting (and thus not processable) with relatively poor mechanical properties.

In recent years, progress has been made toward rendering specific conjugated polymer systems soluble and thereby processable. For example, the poly(3-alkylthiophene) derivatives (P3ATs) of polythiophene are soluble and meltable with alkyl chains of sufficient length, and the P3ATs have been processed into films and fibers. See, e.g., Hotta, S., et al., *Macromolecules*, 20:212 (1987); Nowak, M., et al., *Macromolecules*, 22:2917 (1989); Eisenbaumer, R.L., et al., *Synth. Met.*, 26:267 (1988). However, because of the moderate molecular weights and/or the molecular structures of these polymers, the mechanical properties (modulus and tensile strength) of fibers and films, etc., of the P3ATs are modest and limit their use in applications.

Alternative methods of processing conductive polymers have been developed. For example, poly(phenylenevinylene) ("PPV") and alkoxy derivative of PPV have been synthesized via the precursor polymer route. See, for example, U.S. Pat. Nos. 3,401,152 and 3,706,677 to Wessling et al.; Gagnon et al., *Am. Chem. Soc Polym. Prepr.* 25:284 (1984); Momii et al., *Chem. Lett.* 7:1201–4 (1988); and Yamada et al., *JCS Chem. Commun.* 19:1448–9 (1987). In the first step, a saturated precursor polymer is synthesized; the precursor polymer is soluble and can be processed into the desired final shape. As the final step, the precursor polymer is thermally converted into the desired final shape. As the final step, the precursor polymer is thermally converted to the conjugated polymer. Since tensile drawing can be carried out during the thermal conversion heat treatment, significant chain extension and chain alignment of the resulting conjugated polymers can be achieved. Although the precursor polymer route may offer advantages, the multi-step synthesis is complex, makes the resultant materials relatively expensive, and limits their utility.

On the other hand, ultra-high molecular weight ("UHMW") polyethylene ("PE") can be chain-extended and chain-aligned by first dissolving the polymer in an appropriate solvent at an elevated temperature, then forming a gel by cooling, and subsequently carrying out tensile drawing at selected conditions (temperature, time, etc.) to yield fibers and films etc. with the truly outstanding mechanical properties which characterize high-performance polymers (see Table 1 below).

Today, most polymers (such as UHMW PE) with outstanding mechanical properties are insulators. It would clearly be desirable to render such materials conducting. Previous attempts to render such materials conducting have utilized the general method of filling them with a volume fraction of conducting material such as particles of carbon black, or metal flakes or particles (for example, silver flakes). Addition of such fillers at sufficiently high quantity to yield connected conducting paths (i.e., to be above the percolation threshold; for example, typically about 16% v/v for approximately spherical particles) results in moderate electrical conductivity, but at the expense of the material's mechanical properties. That is, tensile strength and elongation at break are severely reduced by incorporation of the fillers.

Similarly, most polymers with outstanding mechanical properties are either not readily dyed, or, when pigmented, exhibit some loss of tensile strength or modulus, or both.

Thus, the ability to obtain conducting and/or colored olefins or other polymers with attractive mechanical properties and the ability to fabricate such conductive polymers into shaped articles such as fibers, films and the like remains seriously limited.

SUMMARY OF THE INVENTION

It is accordingly an object of the present invention to overcome the aforementioned disadvantages of the prior art and to provide composites of conjugated polymers, which are both electrically conductive and exhibit excellent mechanical properties.

It is additionally an object of the present invention to provide composites of selected carrier polymers and conjugated polymers, said composites exhibiting the varied color characteristics of the conjugated polymers as well as excellent mechanical properties.

It is also an object of the present invention to provide shaped articles (fibers, tapes, fabrics, and the like) from composites of selected carrier polymers and conjugated polymers, said composites being electrically conductive and exhibiting excellent mechanical properties.

It is another object of the present invention to provide shaped articles (fibers, tapes and the like) from composites of selected carrier polymers and conjugated polymers, said composites exhibiting the varied color characteristics of the conjugated polymers as well as excellent mechanical properties.

It is still another object of the invention to provide oriented fibers, tapes and the like from composites of selected carrier polymers and conjugated polymers, said composites being electrically conductive and exhibiting excellent mechanical properties.

It is still another object of the invention to provide oriented fibers, tapes and the like from composites of selected carrier polymers and conjugated polymers, said composites exhibiting the various colors characteristic of the conjugated polymers as well as excellent mechanical properties.

It is a further object of the invention to provide methods of making the aforementioned shaped articles from composites of selected carrier polymers and conjugated polymers, said composites being electrically conductive and exhibiting excellent mechanical properties.

Additional objects, advantages and novel features of the invention will be set forth in part in the description which follows, and in part will become apparent to those skilled in the art on examination of the following, or may be learned by practice of the invention.

In one aspect of the invention, shaped, conducting articles such as fibers, tapes, rods, and films are fabricated from a "carrier" polymer; for example, from ultra-high molecular weight polyethylene (UHMW PE). Initially, a relatively dilute solution is made of a desired quantity of soluble conjugated polymer (such as, for example, the P3ATs) in a suitable solvent. Alternatively, the solution can be made of a quantity of a polymeric precursor which may be converted either chemically or thermally to a desired conjugated polymer (as in the case of PPV and its derivatives). A mechanically coherent, shaped structure is then prepared, e.g., in the form of a fiber, tape, film, or the like; this structure is comprised of the carrier polymer and either the conjugated polymer or the precursor. The blend fibers, tapes, films, or the like are then subjected to tensile drawing to yield the desired shaped articles.

Surprisingly, the inventors herein have found that composite articles fabricated through this processing route have excellent mechanical properties, i.e., with respect to tensile strength, elongation at break, and the like, and are electrically conductive as well. If desired, the composite articles may also be fabricated so as to retain color.

BRIEF DESCRIPTION OF THE FIGURES

FIGS. 2-1, 2-2 schematically illustrate the synthesis of poly(2,5-dimethoxy-p-phenylenevinylene) (PMPV) as described in Example 12.

DETAILED DESCRIPTION OF THE INVENTION

In essence, the method of the present invention involves three steps: (1) the dissolution of the appropriate soluble carrier polymer and either a soluble conjugated polymer or a soluble precursor to a particular conjugated polymer, in a suitable solvent; (2) the preparation of a shaped article from the polymer solution; and (3) processing of the shaped article through tensile drawing at a predetermined selected temperature to chain-extend or chain-align the carrier polymer, and to chain-extend and chain-align the conjugated polymer as well. Where a precursor is used in step (1) (for example, in the route to PPV and its derivatives), the tensile drawing at a predetermined selected temperature during step (3) also serves to convert the precursor polymer to the conjugated polymer. The articles formed by the present process—typically fibers, rods, tapes, or films of the otherwise colorless and insulating "carrier" polymer—are electrically conductive, exhibit excellent mechanical properties, and may or may not be colored.

A. Definitions

For reference, the various categories of mechanical properties of polymers are summarized in the following table:

TABLE 1

| Typical Mechanical Properties of Polymer Types | | |
|---|---|---|
| | Modulus (GPa) | Tensile Strength (GPa) |
| Rubbers | 0.001–0.1 | 0.001–0.1 |
| Textile fibers | 0.5–5 | 0.05–0.5 |
| Industrial fibers | 5–20 | 1–2 |

TABLE 1-continued

| Typical Mechanical Properties of Polymer Types | | |
|---|---|---|
| | Modulus (GPa) | Tensile Strength (GPa) |
| (tire yarn, fishing line, parachute cord, etc.) | | |
| High performance (bullet proof, etc.) | 50–200 | 2–5 |

Although the ranges given in the table are approximate, the numbers serve to delineate the various types of applications.

A "shaped article" as used herein is intended to mean a mechanically coherent object having a defined form, for example, a fiber, rod, film, or tape. The inventiveness of the present process lies in the ability to form shaped articles (by means of solution processing) of polymers such as UHMW PE which are electrically conductive and exhibit excellent mechanical properties over the full range indicated in Table 1.

A "conjugated" polymer as used herein means a polymer having a pi electron network which allows for electron transfer substantially throughout its molecular structure. Conjugated polymers are typically highly colored because of the strong absorption associated with the $\pi$-$\pi^*$ transition; the color, if any, will depend on the specific polymer, for the energy of the $\pi$-$\pi^*$ transition is determined by the polymer structure.

By "substantially nonconducting" as used herein to describe the carrier polymer is meant a conductivity $\sigma$ of less than about 0.1 S/cm and preferably less than 0.05 S/cm.

The conductivity $\sigma$ of the composite materials provided and described herein is given as the conductivity after doping, i.e., during or after preparation of the composite as described herein, the material is rendered conductive by either p-type (oxidative) or n-type (reductive) doping using standard dopants and techniques.

A "precursor" polymer as used herein is a partly saturated polymer which can be converted to a final conjugated polymer by thermal treatment or by chemical treatment, or both. The precursor polymer is soluble in common solvents, whereas the converted conjugated polymer is either not soluble in such solvents or much less soluble than the precursor polymer.

A polymer "composite" or "blend" as used herein means a structural mixture of two or more polymeric materials which may or may not be covalently bound to one another.

An "oriented" material as used herein is intended to mean a polymeric structure in which individual polymeric chains are substantially linear and parallel.

General, "flexible chain" polymers are structures which allow for more variation in bending angle along the chains (characteristic ratio $C_\infty$ typically less than 10), while "rigid rod" polymers tend to be straighter and more highly oriented (characteristic ratio $C_\infty$ typically greater than about 100). See P.J. Flory, Statistical Mechanics of Chain Molecules, N.Y., Wiley & Sons - Interscience, 1969, p. 11.

I. SOLUTION PROCESSING

A. Carrier Polymers

The criteria for the selection of the carrier polymer are as follows. The polymer is preferably a substantially nonconducting, flexible-chain polymer which allows for the formation of mechanically coherent structures (fibers, films, rods, tapes, etc.) at low concentrations, and which is stable with respect to the solvent used in processing. Low concentrations of carrier polymer are preferred in order to minimize processing difficulties, i.e., excessively high viscosity or the formation of gross inhomogeneities; however, the concentration of the carrier should be high enough to allow for formation of coherent structures. Preferred carrier polymers are high molecular weight (molecular weight greater than about 100,000, more preferably greater than about 500,000) flexible-chain polymers, such as polyethylene, isotactic polypropylene, polyethylene oxide, polystyrene, and the like, and particularly preferred carrier polymers are polyethylene and polypropylene. Under appropriate conditions, which can be readily determined by those skilled in the art, these macromolecular materials enable the formation of coherent structures from a wide variety of liquids, including water, acids, and numerous polar and nonpolar organic solvents. Structures manufactured using these carrier polymers have sufficient mechanical strength at polymer concentrations as low as 1%, even as low as 0.1%, by volume, to enable the subsequent processing into the desired shaped article.

Mechanically coherent structures can also be prepared from lower molecular weight flexible chain polymers, but generally, higher concentrations of these carrier polymers are required. Higher concentrations may have an undesirable effect on the drawability and properties of the final products.

Selection of the carrier polymer is made primarily on the basis of compatibility of the final conducting polymer and its reactants, as well as with the solvent or solvents used. For example, blending of polar conducting polymers generally requires carrier structures that are capable of codissolving with or absorbing polar reactants. Examples of such coherent structures are those comprised of poly(vinyl alcohol), poly(ethylene oxide), poly-para(phenylene terephthalate), poly-para-benzamide, etc., and suitable liquids. On the other hand, if the blending of the final polymer cannot proceed in a polar environment, nonpolar carrier structures are selected, such as those containing polyethylene, polypropylene, poly(butadiene), and the like.

It should of course be noted that more than one carrier polymer may be used to form the carrier solution and ultimately become a part of the final composite; i.e., mixtures of two or more carrier polymers may be incorporated into the initial carrier solution.

Turning now to the issue of concentration, it is of crucial importance that the carrier structure formed have sufficient mechanical coherence for further handling during the formation of the final polymer blend. Therefore, the initial concentration of the carrier polymer generally is selected above 0.1% by volume, and more preferably above about 0.75% by volume. On the other hand, it is not desirable to select carrier polymer concentrations exceeding 90% by volume, because this has a diluting effect on the drawability of the final polymer product. More preferably, the concentration of the carrier polymer in the initial solution is below about 50% by volume, and still more preferably below about 25% by volume. These concentrations are designed to provide a final composite in which the conducting polymer represents at least about 5 wt.% of the total composite, more preferably at least about 10 wt.%, most preferably at least about 20 wt.%.

Thus, in the initial step of the present process, a carrier solution is provided by dissolving a selected carrier polymer in a compatible solvent or mixture of solvents to a predetermined concentration, using the aforementioned guidelines. In the present process, the "compatible solvent" is a solvent system into which a desired quantity of soluble conjugated polymer (or soluble precursor polymer) has been dissolved. The solvent system is one in which, clearly, the carrier polymer is substantially soluble, and will not interfere with the subsequent structure formation process. The carrier solution is formed into selected shape, e.g., a fiber, tape, rod, film or the like, by extrusion or by any other suitable method. The solvent is then removed (through evaporation, extraction, or any other convenient method).

B. Carrier Structure Formation

After preparation of the initial carrier solution, a selected conjugated polymer, soluble in the carrier polymer and solvent, is added into the solution, i.e., prior to gelation. Virtually any conjuqated polymer as defined above may be used. Examples of particularly suitable "soluble" conjugated polymers for use herein include the P3ATs and alkoxy derivatives thereof.

In an alternative embodiment, a polymeric precursor which may be converted to the desired conjugated polymer is used. The precursor must, as above, be soluble in both the carrier polymer and solvent. It will typically be readily converted to the ultimately desired polymer via either thermal or chemical means. If such is the case, the thermal or chemical treatment may take place either before, during, or after gelation. Examples of soluble precursor polymers include those described by Wessling et al. in U.S. Pat. Nos. 3,401,152 and 3,706,677, cited supra (i.e., as precursors to PPV) as well as those described by Gagnon et al., Momii et al., and Yamada et al., all cited supra.

The quantity of soluble conjugated polymer or precursor polymer dissolved in the carrier solution is such that the conjugated polymer will represent at least about 5 wt.%, more preferably at least about 10 wt.%, and most preferably at least about 20 wt.%, of the final composite article.

Gels can be formed from the carrier solution in various ways, e.g., through chemical crosslinking of the macromolecules in solution, swelling of crosslinked macromolecules, thermoreversible gelation, and coagulation of polymer solutions. In the present invention, the two latter types of gel formation are preferred, although under certain experimental conditions, chemically crosslinked gels may be preferred.

Thermoreversible gelation refers to the physical transformation of polymer solution to polymer gel upon lowering the temperature of a homogeneous polymer solution (although in exceptional cases a temperature elevation may be required). This mode of polymer gelation requires the preparation of a homogeneous solution of the selected carrier polymer in an appropriate solvent according to standard techniques known to those skilled in the art. The polymer solution is cast or extruded into a fiber, rod, or film form, and the temperature is lowered to below the gelation temperature of the polymer in order to form coherent gels. This procedure is well known and is commercially employed, e.g., for the formation of gels of high molecular weight polyethylene in decalin, paraffin oil, oligomeric polyolefins, xylene, etc., as a precursor for high-strength polyolefin fibers and films.

"Coagulation" of a polymer solution involves contacting the solution with a nonsolvent for the dissolved polymer, thus causing the polymer to precipitate. This process is well known, and is commercially employed, for example, in the formation of rayon fibers and films, and in the spinning of high-performance aramid fibers, etc.

Alternatively, "dry" spinning can be employed. In this method, the solvent is removed by evaporation, leading to the desired carrier structure formation.

II. DRAWING OF THE CARRIER/POLYMER COMPOSITE

It is frequently desirable to subject the carrier polymer/conducting polymer or precursor composite to mechanical deformation, typically by stretching at least about 100% in length, during or after the initial forming step. Deformation of polymeric materials is carried out in order to orient the macromolecules in the direction of draw, which deformation results in improved mechanical properties. Maximum deformation of thermoreversible gels are substantially greater than melt-processed materials. (P. Smith and P.J. Lemstra, *Colloid and Polym. Sci.*, 258:891 (1980). The large draw ratios possible with thermoreversible gels are also advantageous if composite materials may be prepared with materials limited in their drawability due to low molecular weights. In the case of conducting polymers, not only do the mechanical properties improve, but, more importantly, the electrical conductivity also often displays drastic enhancement upon tensile drawing.

The materials prepared according to the aforementioned method are thus shaped polymer blends or composites, i.e., fibers, rods, films, tapes, or the like, which are electrically conductive and which display superior mechanical properties. More specifically, the composites provided herein have an electrical conductivity $\sigma$ of at least about 0.75 S/cm and a Young's modulus E of at least about 0.4 Gpa, such that the product of o and E is at least about 0.3 (GPa)(S/cm). More preferably, the product o.E of the composite materials of the invention is at least about 1 (GPa)(S/cm), most preferably at least about 5 (GPa)(S/cm).

It is to be understood that while the invention has been described in conjunction with the preferred specific embodiments thereof, that the foregoing description as well as the examples which follow are intended to illustrate and not to limit the scope of the invention. Other aspects, advantages and modifications within the scope of the invention will be apparent to those skilled in the art to which the invention pertains.

EXPERIMENTAL

Mechanical Properties: The mechanical properties of the various materials described in the examples were tested at room temperature using an Instron Tensile Tester Model 1122. The initial length of the test specimen was from 10 to 25 mm, and the crosshead speed was 10 mm/min. The modulus of the fibers was taken to be the initial, or Young's, modulus. The denier (linear density) of the samples was measured by weighing 100 to 200 mm of the fibers. The cross-sectional areas of the fibers were determined from a knowledge of the linear density in combination with knowledge of the polymer or polymer composite density.

Electrical Conductivity Measurements: A four-probe techniques for conductivity measurement was used to measure the conductivity of the materials herein. The four contacts were made on the surface of the sample fibers in a linear array. The testing probe was placed into a evacuable chamber from which ambient atmosphere was removed and into which iodine vapors were introduced. The vapor pressure of iodine at room temperature was 0.34 mm Hg. A current (1) was passed through the outermost probes and the voltage drop measured across the innermost probes. The voltage measurement was carried out by means of a high-impedance voltmeter and is considered to be essentially a zero current measurement. Hence, the contact resistance between the innermost probes and the sample is minute, since the current flow through the voltmeter is minute. Ohmic contacts were carried out using conductive carbon paint contacts (SPI, Inc., West Chester, PA) in which platinum electrodes were attached to the fiber by means of finely divided graphite in isopropyl alcohol. The resistance (R) of the fibers was first measured by the four-probe technique. The length (L) was measured with a ruler, and the cross-section area (A) was determined gravimetrically. The conductivity of the fiber was then calculated by the following equation:

$$\sigma = (L/AR)$$

where $\sigma$ is the electrical conductivity.

EXAMPLE 1

Figure 1:
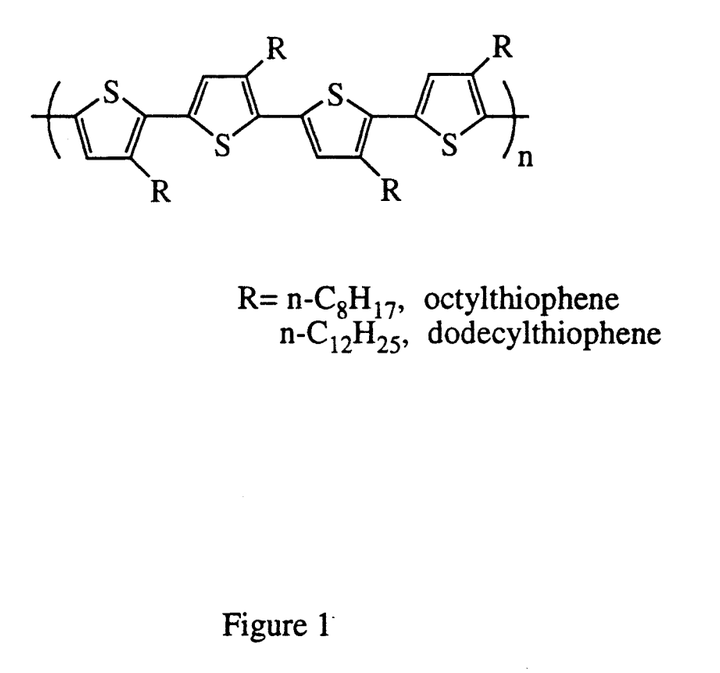
FIG. 1 illustrates the chemical structure of the poly(3-alkylthiophenes) as discussed in Example 1.

The poly(3-alkythiophenes) were prepared by direct oxidation of the appropriate 3-alkylthiophene by FeCl$_3$ (J.-E. Osterholm et al., *Synth. Met.*, 28:C435 (1989)). FIG. 1 shows the chemical structure of the poly(3-alkylthiophenes). A 100%-by-weight film of poly(3-octylthiophene) was cast onto glass from a 3 wt.% solution in chloroform (Fisher Scientific). The films were dried under nitrogen and lifted from the substrate by soaking in methanol (Fisher Scientific). Appropriate samples were cut from the dried films and subsequently drawn to their maximum draw ratio (L+ΔL/L) at a variety of temperatures on the Instron Tensile Tester equipped with an oven capable of maintaining such temperatures.

The maximum attained draw rations were as follows:

| Temperature (°C.) | Draw Ratio |
| --- | --- |
| 25 | 3.1 |
| 80 | 4.5 |
| 90 | 5.3 |
| 95 | 5.3 |
| 100 | 6.1 |
| 105 | 6.1 |
| 110 | 6.2 |
| 120 | 5.0 |
| 130 | 1.7 |

EXAMPLE 2

A 100%-by-weight film of poly(3-dodecylthiophene) (PDDT) was cast onto glass from a 3 wt.% solution in chloroform (Fisher Scientific). The films were dried under nitrogen and lifted from the substrate by soaking in methanol (Fisher Scientific). A 100%-by-weight poly(3-octylthiophene) (POT) fiber was produced by set spinning into acetone (Fisher Scientific) according to standard procedures. The films of PDDT were cut to appropriate sizes and drawn to various draw ratios at 100° C. in air. The fibers and films of the POT and PDDT have a lustrous greenish appearance on reflection and are red in transmission. The mechanical properties of the drawn polymers are listed below:

| Draw Ratio | Young's Modulus (GPa) | Tensile Strength (GPa) | Elongation at Break (%) |
| --- | --- | --- | --- |
| Poly(3-octylthiophene) | | | |
| 1 | 0.05 | 0.007 | 351 |
| 2.8 | 0.21 | 0.03 | 18 |
| 3.8 | 0.38 | 0.04 | 13 |
| Poly(3-dodecylthiophene) | | | |
| 1 | 0.02 | 0.004 | 95 |
| 2.8 | 0.14 | 0.02 | 22 |
| 3.1 | 0.20 | 0.03 | 19 |

These data illustrate the relatively poor mechanical properties of the drawn, soluble poly(alkylthiophenes).

EXAMPLE 3

The poly(3-dodecylthiophene) samples of Example 2 were drawn, in air, at 100° C. to various draw ratios. The poly(3-octylthiophene) samples of Example 2 were drawn, in air, at 105° C to various draw ratios. The drawn poly(3-octylthiophene) samples were then doped at room temperature in iodine vapor and measured using a 4-probe device. The poly(3-dodecylthiophene) samples were doped at 40° C. in 1.74 wt.% solution of 488 mg $NOSbF_6$ (Alfa Chemicals) in 27.51 g acetonitrile (Aldrich). The conductivities of the films or fibers reached constant values of:

| Draw Ratio | Conductivity (S/cm) |
| --- | --- |
| Poly(3-octylthiophene) | |
| 1 | 6 |
| 2.8 | 17 |
| 3.8 | 28 |
| Poly(3-dodecylthiophene) | |
| 1 | 17 |
| 2.8 | 52 |
| 3.1 | 66 |

EXAMPLE 4

Decalin (decahydronaphthalene, Aldrich); 9.7 g was mixed at room temperature with 225 mg of polyoctylthiophene in a 50 ml test tube. This stirred mixture was blanketed with nitrogen gas and heated to 104° C., at which time 75 mg of ultra-high molecular weight polyethylene (Hostalen GUR 415, Hoechst) was added. Subsequently, the mixture was heated to a temperature of 115° C., at which point stirring was stopped, and the temperature was raised further to 150° C. for 1 hour. A viscous orange liquid was obtained. The solution was cooled, and the red-orange gel was transferred to a laboratory-scale spinning apparatus. A polyethylene/polyoctylthiophene gel fiber was spun according to standard procedures. In this example the gel fiber was spun directly onto the bobbin.

The composite fiber was 78 denier and dark red-brown in color.

The polyoctylthiophene content of this composite fiber was 75% by weight.

The mechanical properties of the composite fiber were determined to be as follows for various draw ratios, with the samples being drawn at 105° C. in air. A comparison between the poly(3-octylthiophene) of Example 1 and the composite fiber of this example shows the significantly improved mechanical properties of the latter.

| Draw Ratio | Young's Modulus (GPa) | Tensile Strength (GPa) | Elongation at Break (%) |
| --- | --- | --- | --- |
| 1 | 0.43 | 0.08 | 1074 |
| 3.4 | 0.43 | 0.06 | 380 |
| 4.2 | 0.67 | 0.08 | 47 |
| 5.8 | 1.05 | 0.11 | 41 |

EXAMPLE 5

The polyoctylthiophene/polyethylene composite fiber of Example 4 was drawn, in air, at 105° C. to various draw ratios. The drawn samples were then doped at room temperature in iodine vapor and measured using a 4-probe device until such time that the measured potential was constant. The conductivities of the composite fibers reached constant values of:

| Draw Ratio | Conductivity (S/cm) |
| --- | --- |
| 1 | 6 |
| 3.4 | 25 |
| 4.2 | 38 |
| 5.8 | 35 |

EXAMPLE 6

Decalin (decahydronaphthalene, Aldrich); 9.7 g was mixed, at room temperature, with 225 mg of polyoctylthiophene in a 50 ml test tube. This stirred mixture was blanketed with nitrogen gas and heated to 104° C., at which time 75 mg of ultra-high molecular weight polyethylene (Hostalgen GUR 415, Hoechst) was added. Subsequently, the mixture was heated to a temperature of 155° C., at which point stirring was stopped, and the temperature was raised further to 150° C. for 1 hour. A viscous orange liquid was obtained. The solution was cooled, and the red-orange gel was transferred to a laboratory-scale spinning apparatus. The gel used in this example was identical to that used in Example 4; only the method of spinning the gel fiber was changed. A polyethylene/polyoctylthiophene gel fiber was dry-jet wet spun into a nonsolvent coagulating bath according to standard procedures.

The composite fiber was of 68 denier, and dark red-brown in color.

The polyoctylthiophene content of this composite fiber was estimated to be 75% by weight.

The mechanical properties of the composite fiber were determined to be as follows for various draw ratios, with the samples being drawn at 105° C. in air.

| Draw Ratio | Young's Modulus (GPa) | Tensile Strength (GPa) | Elongation at Break (%) |
| --- | --- | --- | --- |
| 1 | 0.63 | 0.02 | 756 |
| 4.1 | 1.00 | 0.08 | 27 |
| 6 | 1.58 | 0.16 | 17 |
| 30 | 12.6 | 0.69 | 11 |

EXAMPLE 7

The polyoctylthiophene/polyethylene composite fiber of Example 6 was dried and drawn, in air, at 105° C. to various draw ratios. The drawn samples were then doped at room temperature in iodine vapor using a 4-probe device. The conductivities of the composite fibers reached constant values of:

| Draw Ratio | Conductivity (S/cm) |
|---|---|
| 1 | 2 |
| 4.1 | 22 |
| 6 | 32 |
| 30 | 20 |

EXAMPLE 8

Decalin (decahydronaphthalene, Aldrich); 9.7 g was mixed, at room temperature, with 200 mg of polydodecylthiophene in a 50 ml test tube. This stirred mixture was blanketed with nitrogen gas and heated to 104° C., at which time 200 mg of ultra-high molecular weight polyethylene (Hostalen GUR 415, Hoechst) was added. Subsequently, the mixture was heated to a temperature of 115° C., at which point stirring was stopped, and the temperature was raised further to 150° C. for 1 hour. A viscous orange liquid was obtained. The solution was cooled, and the red-orange gel was transferred to a laboratory-scale spinning apparatus. A polyethylene/polydodecythiophene gel fiber was spun according to standard procedures, and subsequently drawn at 105° C. in air.

The composite fiber was of 600 denier, and dark red-brown in color.

The polyoctylthiophene content of this composite fiber was 50% by weight.

| Draw Ratio | Young's Modulus (GPa) | Tensile Strength (GPa) | Elongation at Break (%) |
|---|---|---|---|
| 8 | 2.49 | 0.36 | 28 |

EXAMPLE 9

The polydodecylthiophene/polyethylene composite fiber of Example 8 was drawn, in air, at 105° C. The drawn samples were doped at 40° C. in d1.75 wt. % solution of 488 mg NOSbF6 (Alfa Chemicals) in 27.5 g acetonitrile (Aldrich). The doped samples were removed from the doping solution, washed 3 times in dry acetonitrile, and then air dried. The conductivities were measured using a 4-point probe device. The conductivities of the composite fibers reached constant values of:

| Draw Ratio | Conductivity (S/cm) |
|---|---|
| 1 | 0.2 |
| 8 | 30 |

EXAMPLE 10

As in Example 4, a series of polyoctylthiophene (POT)/polyethylene composite fibers were prepared such that the total polymer concentration in the gel was maintained at 1.5% by weight. All composite fiber samples were drawn to various draw ratios at 105° C. in air.

A comparison of the moduli from composite fibers in Example 10 are combined with data from Example 2 and Example 4 shows the drastically improved mechanical properties of the composite fibers.

The composite fibers were of the following denier:

| Weight Percent POT | denier |
|---|---|
| 20 | 55 |
| 30 | 57 |
| 50 | 39 |
| 90 | 56 |

| Draw Ratio | Young's Modulus (GPa) | Tensile Strength (GPa) | Elongation at Break (%) |
|---|---|---|---|
| 20%-by-weight POT | | | |
| 3.4 | 2.40 | 0.21 | 844 |
| 4.1 | 5.65 | 0.38 | 145 |
| 4.8 | 7.77 | 0.50 | 30 |
| 30%-by-weight POT | | | |
| 2.8 | 2.12 | 0.18 | 495 |
| 5.0 | 4.92 | 0.34 | 92 |
| 6.7 | 7.78 | 0.55 | 23 |
| 50%-by-weight POT | | | |
| 2.5 | 1.05 | 0.13 | 803 |
| 3.0 | 3.09 | 0.25 | 213 |
| 8.0 | 7.66 | 0.51 | 52 |
| 24 | 19.05 | 0.51 | 52 |
| 90%-by-weight POT | | | |
| 5.0 | 0.84 | 0.10 | 21 |
| 6.3 | 1.17 | 0.12 | 15 |

EXAMPLE 11

The polyoctylthiophene/polyethylene composite fibers of Example 10 were dried and drawn, in air, at 105° C. to various draw ratios. The samples were then doped at room temperature in iodine vapor to constant measured potentials using a 4-point probe device. A comparison of the measured conductivities from composite fibers in Example 10 are combined with data from Example 5 in FIG. 6. The conductivities of the composite fibers reached constant values of:

| Draw Ratio | Conductivity (S/cm) |
|---|---|
| 20%-by-weight POT | |
| 1 | 0.07 |
| 4.1 | 0.5 |
| 44.8 | 1 |
| 30%-by-weight POT | |
| 1 | 0.08 |
| 2.8 | 0.4 |
| 5.0 | 2 |
| 6.7 | 1 |
| 50%-by-weight POT | |
| 1 | 0.9 |
| 2.5 | 4 |
| 3.0 | 7 |
| 8.0 | 9 |
| 24 | 1 |
| 90%-by-weight POT | |
| 1 | 7 |
| 3.1 | 25 |
| 5.0 | 46 |
| 6.3 | 39 |

EXAMPLE 12

Synthesis of precursor polymer of poly(2,5-dimethoxy-p-phenylenevinylene) (PMPV)

Figure 21:
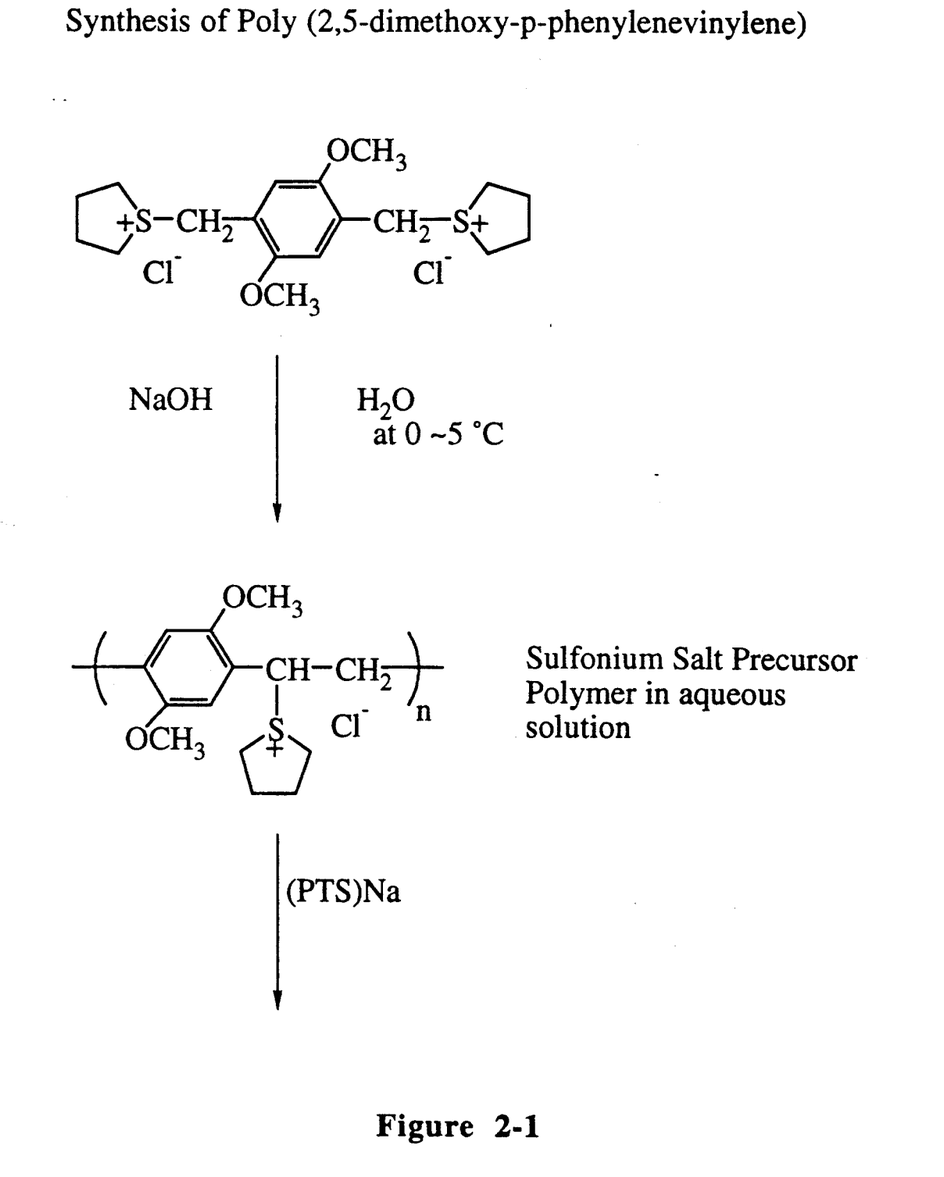
Figure 22:
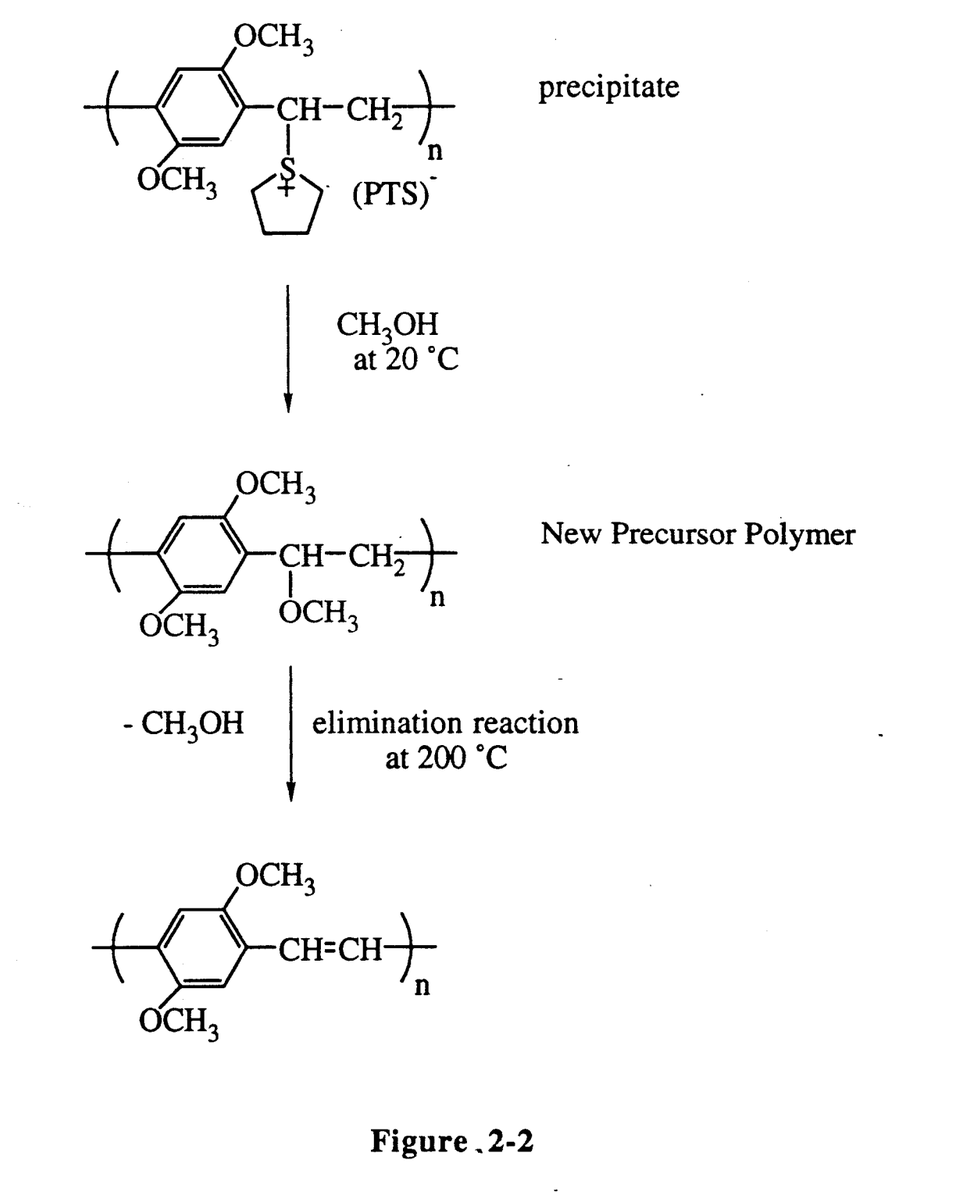

The synthesis of the precursor polymer was carried out essentially according to the procedure described in the literature (T. Momii et al., *Chem. Lett.*, 1201 (1987); S. Tokito et al., *Polymer*, to be published 1989) as shown in FIG. 2. The polymerization was carried out by mixing equal volumes of 0.4 M aqueous monomer and 0.4 M aqueous NaOH at 0–10° C. for 1 hour. After 5 minutes reaction, the mixture formed a transparent gel. This gel was dissolved in distilled water followed by the addition of an excess amount of p-toluene sulfonic acid sodium salt (PTS), giving a white precipitate of the sulfonium salt polymer with a p-toluene sulfonic acid counter anion. The precipitate was filtered and dissolved in methanol and reacted at 20° C. After 50 hours of stirring, a powdery precursor polymer was extracted; this polymer is soluble in common organic solvents such as chloroform, tetrahydrofuran, and dichloromethane. The precursor polymer was purified by reprecipitation from chloroform solution into hexane.

B. Preparation of Carrier Gel

Purified precursor polymer (PPMPV, 50 mg) was dissolved in a mixture of 3 ml xylene and 0.5 ml chloroform. The solution of precursor polymer was mixed at 60° C. with 62 mg of ultra-high molecular weight polyethylene (Hostaloen GUR 412, Hoechst) in a 20 ml test tube. This mixture was heated at a temperature of 130° C for 30 minutes with stirring, and then cooled to ambient temperature. The resultant composite gel was yellow. Composite filaments of polyethylene and PPMPV were spun using laboratory-scale equipment at 130° C. The as-spun filament was subsequently wound on a bobbin and dried in a vacuum oven over night.

C. Drawing of Composite Filament

The dried composite filaments (PPMPV/PE =46 wt% PDMPV) were drawn at 140° C. under nitrogen flow by using the laboratory-scale drawing system as shown in FIG. 3. The draw ratio was varied by changing the speed of the two motors. The drawn fibers were heated to convert precursor polymer to PMPV at 110° C. for 10 hours under nitrogen gas containing a small amount of the vapor of hydrochloric acid (the nitrogen gas was first passed over HCl at room temperature). The acid catalyst plays an important role in the conversion reaction (see T. Momii et al., *Chem. Lett.*, 1201 (1987)). After 10 hours of heating, the highly oriented composite fibers which contained 60 wt% of PE and 40 wt% of PMPV, were obtained. The composite fibers were red with a shiny metallic luster.

Mechanical properties of the composite fiber are listed below. These values are comparable to the values of highly oriented polyethylene fiber. (p. Mith and P.J. Lemstra, *J. Mat. Sci.*, 15:505 (1980)) and are characteristic of high-performance polymers (see Table 1).

| Draw Ratio | Young's Modulus (GPa) | Tensile Strength (GPa) | Elongation at Break (%) |
|---|---|---|---|
| 3 | 3.4 | 0.3 | 126 |
| 4 | 4.6 | 0.46 | 83 |
| 6 | 11 | 0.83 | 28 |
| 8 | 15 | 1.1 | 15 |
| 10 | 22 | 1.5 | 12 |
| 12 | 28 | 1.8 | 10 |
| 15 | 54 | 2.7 | 8 |
| 19 | 58 | 2.7 | 7 |
| 23 | 64 | 3.0 | 6 |

EXAMPLE 13

The composite fibers (40 wt%, PDMPV) of Example 12 were doped with iodine by exposing the fibers to iodine vapor at room temperature. The conductivities of the doped composite fibers were measured by the conventional 4-probe method. The conductivities are listed below:

| Draw Ratio | Conductivity (S/cm) |
|---|---|
| 3 | 1 |
| 4 | 1 |
| 6 | 0.3 |

The mechanical properties of the doped composite fibers are listed below:

| Draw Ratio | Young's Modulus (GPa) | Tensile Strength (GPa) | Elongation at Break (%) |
|---|---|---|---|
| 3 | 3.3 | 0.32 | 110 |
| 4 | 5.0 | 0.46 | 65 |
| 6 | 9.1 | 0.82 | 27 |
| 8 | 14 | 1.1 | 17 |
| 10 | 21 | 1.5 | 13 |
| 12 | 29 | 1.9 | 11 |
| 15 | 46 | 2.5 | 8 |
| 19 | 50 | 2.5 | 7 |
| 23 | 54 | 2.6 | 6 |

EXAMPLE 14

The composite fibers prepared in Example 12(B) were drawn and converted simultaneously. Nitrogen gas containing a small amount of hydrochloric acid vapor was introduced into the tube furnace during heating and drawing.

The mechanical properties are listed below.

| Draw Ratio | Young's Modulus (GPa) | Tensile Strength (GPa) | Elongation at Break (%) |
|---|---|---|---|
| 2 | 2.1 | 0.2 | 30 |
| 4 | 6.4 | 0.37 | 30 |
| 6 | 15 | 0.8 | 10 |
| 9 | 24 | 1.2 | 9 |
| 12 | 28 | 1.4 | 8 |
| 16 | 36 | 2.0 | 7 |
| 21 | 43 | 2.0 | 6 |
| 25 | 58 | 2.4 | 5 |

EXAMPLE 15

The composite fibers (40 wt%, PDMPV) of Example 13 were doped with iodine by exposing the fibers of iodine vapor at room temperature. The conductivities of the doped composite fibers were measured by the conventional 4-probe method. The conductivities are listed below:

| Draw Ratio | Conductivity (S/cm) |
|---|---|
| 3 | 4 |
| 4 | 1 |
| 7 | 0.3 |
| 12 | 0.2 |
| 17 | 0.2 |
| 21 | 0.1 |

EXAMPLE 16

The composite filaments with different concentrations of precursor polymer were prepared according to Example 12(B). The composite filaments were drawn and converted by using the same system as described in Example 14.

The mechanical properties and conductivities of the composite fibers (concentrations of precursor, 20 wt.%, 29 wt%, and 31wt%) are listed below:

| PMPV = 20 wt % | | | |
|---|---|---|---|
| Draw Ratio | Young's Modulus (GPa) | Tensile Strength (GPa) | Elongation at Break (%) |
| 3 | 4.3 | 0.28 | 68 |
| 4 | 9.2 | 0.53 | 26 |
| 7 | 14 | 0.77 | 21 |
| 12 | 23 | 1.3 | 10 |
| 17 | 42 | 1.8 | 6 |
| 19 | 53 | 2.8 | 9 |
| 21 | 57 | 2.6 | 7 |
| 26 | 90 | 3.8 | 5 |

| Draw Ratio | Conductivity (S/cm) |
|---|---|
| 4 | 1 |
| 7 | 0.3 |
| 12 | 0.2 |
| 19 | 0.09 |

| PMPV = 29 wt % | | | |
|---|---|---|---|
| Draw Ratio | Young's Modulus (GPa) | Tensile Strength (GPa) | Elongation at Break (%) |
| 4 | 6.4 | 0.4 | 78 |
| 21 | 34 | 1.4 | 5 |

| Draw Ratio | Conductivity (S/cm) |
|---|---|
| 4 | 3.3 |
| 21 | 1.3 |

| PMPV = 31 wt % | | | |
|---|---|---|---|
| Draw Ratio | Young's Modulus (GPa) | Tensile Strength (GPa) | Elongation at Break (%) |
| 4 | 3.9 | 0.23 | 40 |
| 21 | 44 | 1.9 | 6 |

| Draw Ratio | Conductivity (S/cm) |
|---|---|
| 4 | 2.4 |
| 21 | 0.5 |

We claim:

1. A shaped composite article having an electrical conductivity $\sigma$ and a Young's modulus E, comprising a substantially nonconducting, flexible-chain ultra-high molecular weight polyethylene carrier polymer and a conjugated conducting polymer, prepared by the process which comprises the steps of:
    (a) providing a carrier solution by dissolving in a compatible solvent:
        (i) a predetermined amount of a conjugated, conducting polymer; and
        (ii) at least about 0.1% v/v of a substantially nonconducting, flexible-chain ultra-high molecular weight polyethylene carrier polymer;
    (b) forming said carrier solution into the shape of the desired article;
    (c) treating said carrier solution so as to cause gelation, thereby providing a carrier gel; and
    (d) removing said solvent from the carrier gel,
wherein the product of $\sigma$ and E is at least about 0.3 (GPa) (S/cm).

2. The composite article of claim 1, wherein the product of $\sigma$ and E is at least about 1 (GPa) (S/cm).

3. The composite article of claim 1, wherein the conjugated, conducting polymer represents at least about 5 wt.% of the composite article.

4. The composite article of claim 3, wherein the conjugated, conducting polymer represents at least about 10 wt.% of the composite article.

5. The composite article of claim 4, wherein the conjugated, conducting polymer represents at least about 20 wt.% of the composite article.

6. The composite article of claim 1, wherein said polyethylene has a molecular weight of at least about 100,000.

7. The composite article of claim 6, wherein said polyethylene has a molecular weight of at least about 500,000.

8. The composite article of claim 1, wherein said conjugated, conducting polymer is selected from the group consisting of poly(phenylenevinylene), poly(2,5-dimethoxy-p-phenylenevinylene) and poly(2,5-thieneylenevinylene).

9. The composite article of claim 1, wherein said conjugated, conducting polymer is poly (phenylenevinylene).

10. The composite article of claim 1, wherein said conjugated, conducting polymer is poly(2,5-dimethoxy-p-phenylenevinylene).

11. The composite article of claim 1, wherein said conjugated, conducting polymer is poly(2,5-dimethoxy-p-phenylenevinylene).

12. The composite article of claim 1 in the shape of a fiber.

13. The composite article of claim 1 in the shape of a rod.

14. The composite article of claim 1 in the form of a tape.

15. The composite article of claim 1 in the form of a film.

16. A shaped composite article having an electrical conductivity $\sigma$ and a Young's modulus E, comprising a substantially nonconducting, flexible-chain ultra-high molecular weight polyethylene carrier polymer; and a conjugated, conducting polymer, prepared by the process which comprises the steps of:
    (a) providing a carrier solution by dissolving in a compatible solvent;
    (b) forming said carrier solution into the shape of the desired article;
        (i) a predetermined amount of a precursor polymer selected to give a desired conjugated, conducting polymer upon thermal or chemical treatment; and
        (ii) at least about 0.1% v/v of a substantially nonconducting, flexible-chain ultra-high molecular weight polyethylene carrier polymer;
    (b) forming said carrier solution into the shape of the desired article;

(c) treating said carrier solution so as to cause gelation, thereby providing a carrier gel;

(d) converting said precursor polymer to said conjugated, conducting polymer; and (e) removing said solvent from the carrier gel, wherein the product of $\sigma$ and E is at least about 0.3 (GPa) (S/cm).

17. The composite article of claim 1, wherein said conjugated, conducting polymer is selected from the group consisting of poly(phenylenevinylene), poly(2,5-dimethoxy-p-phenylenevinylene) and poly2,5-thienylenevinylene.

* * * * *